(12) United States Patent
Vischer et al.

(10) Patent No.: US 7,788,166 B2
(45) Date of Patent: Aug. 31, 2010

(54) IMPLIED INDEX CORRELATION AND DISPERSION

(75) Inventors: Axel Vischer, Frankfurt am Main (DE); Sarah Reib, Frankfurt am Main (DE)

(73) Assignee: Deutsche Borse AG, Frankfurt am Main (DE)

( * ) Notice: Subject to any disclaimer, the term of this patent is extended or adjusted under 35 U.S.C. 154(b) by 661 days.

(21) Appl. No.: 11/438,285

(22) Filed: May 23, 2006

(65) Prior Publication Data

US 2007/0282758 A1 Dec. 6, 2007

(51) Int. Cl.
*G06Q 40/00* (2006.01)
(52) U.S. Cl. .......................................... 705/37; 705/38
(58) Field of Classification Search .............. 705/37–38
See application file for complete search history.

(56) References Cited

U.S. PATENT DOCUMENTS

2005/0102214 A1* 5/2005 Speth et al. .................... 705/36

* cited by examiner

*Primary Examiner*—Thu Thao Havan
(74) *Attorney, Agent, or Firm*—Marc S. Kaufman; Nixon Peabody, LLP (57) ABSTRACT

A data processing apparatus and method are provided for calculating an implied correlation and/or dispersion of an index that has a plurality of constituents. Data is received which describes properties of the index and properties of at least some of its constituents. An implied variance of the index and an implied variance of each of the at least some constituents are determined based on the received data. The implied correlation and/or dispersion of the index are calculated using the determined implied variances. A variance calculation scheme may be used which does not require the calculation of a volatility. Further, a model-free algorithm may be used to determine the implied valiances. Furthermore, an implied volatility of the index and an implied volatility for constituents may be determined from the implied variances.

27 Claims, 2 Drawing Sheets

IMPLIED INDEX CORRELATION AND DISPERSION

BACKGROUND OF THE INVENTION

1. Field of the Invention

The invention relates to data processing apparatus and methods, and more particular to processing data relating to an index that has a plurality of constituents.

2. Description of the Related Art

Indices which are built from a number of index constituents are well known in the art. Generally, in economics and finance, an index (for example a price index or stock market index) is a benchmark of activity, performance or any evolution in general.

When investigating an index, one can measure which of the index constituents' returns move up or down. Another, more sophisticated measure is the index correlation. Correlation is a numeric measure of the strength of the linear relationship between two or more variables. In the context of portfolios and indices, correlation measures the degree of diversification of a given portfolio or index. If correlation is high, then the index is relatively less diversified. In this case the index constituents' returns move in the same direction. On the other hand, if correlation is low, then the index is relatively more diversified. This means that the index constituents' returns move in opposite directions.

However, correlation measurements usually require complex calculations to be performed based on economic models. This is particularly the case where the calculations are not only based on historical data but try to calculate implied correlation values. This is computationally very extensive and is therefore often not suitable to do in real-time systems.

SUMMARY OF THE INVENTION

Therefore, embodiments are provided which allow for automatically calculating implied correlations in a simple and efficient manner. Further embodiments are directed to calculate implied index dispersions.

In one embodiment, there is provided a data processing apparatus for calculating an implied correlation of an index that has a plurality of constituents. The apparatus comprises a data input unit which is configured to receive data describing properties of the index and properties of at least some of its constituents. The apparatus further comprises a calculation unit which is configured to calculate the implied correlation of the index based on the received data. The calculation unit is configured to determine an implied variance of the index and an implied variance of each of the at least some constituents, determine an implied volatility of the index and an implied volatility of each of the at least some constituents from the implied variances, and derive the implied correlation from the implied variances and implied volatilities.

According to another embodiment, a data processing method is provided for calculating an implied correlation and/or dispersion of an index that has a plurality of constituents. The method comprises receiving data describing properties of the index and properties of at least some of its constituents, determining an implied variance of the index and an implied variance of each of the at least some constituents based on the received data using a model-free algorithm, and deriving the implied correlation and/or dispersion of the index from the determined implied variances.

In still a further embodiment, a computer-readable medium is provided that stores instructions that, when executed by a processor, cause the processor to calculate an implied correlation and/or dispersion of an index that has a plurality of constituents. Data is received which describes properties of the index and properties of at least some of its constituents. An implied variance of the index and an implied variance of each of the at least some constituents are determined based on the received data using a variance calculation scheme not requiring the calculation of a volatility. The implied correlation and/or dispersion of the index are calculated using the determined implied variances.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

The invention is based on the consideration that in principle, there are two different approaches for the estimation of index correlation: first, it is possible to calculate historical correlation. This may be done by measuring the standard deviations of the stock index and the prices of the index constituents, the latter weighted by their free-float market capitalization or any other weighting scheme. On the other hand, correlation may be derived implicitly from option prices (in the following referred to as 'implied correlation'); this kind of correlation may represent the estimates and assumptions of market participants involved in option trading, on the basis of a given option price. This correlation may be seen to represent future realized correlation. To estimate future realized correlation, the future realized volatilities of the index and the index constituents are calculated first. As will be shown below, the values of future realized volatilities may then find their way into the calculation of the future realized correlation.

In one embodiment, indices are calculated and disseminated that measure implied correlation. For instance, the embodiment may calculate and disseminate a 30-day correlation index (in the following referred to as 'main correlation index'). Further to that, embodiments may calculate and disseminate several sub-indices of the main correlation index. A sub-index is an index which is based on only a part of the index constituents. Besides calculating and disseminating correlation indices, embodiments may also include the dissemination of dispersion indices. The dispersion of an index measures the deviation between the variance of the index and the sum of the weighted variances of the index constituents. Like in the case of the correlation indices, several sub-indices of the main dispersion (30-day) index may be calculated and disseminated.

The necessary implied volatilities for the calculation of the correlation and dispersion indices may be derived from option prices using iterative procedures and the Black/Scholes-formula to calculate option prices. According to the embodiments, a different approach is to make use of model-free implied volatilities. This methodology uses the square root of implied variance across (almost) all options of a given time to expiration. Generally, when applying a model-free algorithm, the embodiments do not make theoretical assumptions on financial models to get a simplified picture on the variables and logical or quantitative relationships between them. Rather, the model-free approach achieves a mathematical estimation without applying hypotheses on financial models. The methodology of using model-free implied volatilities in order to calculate indices for future realized correlation will be described in more detail below.

In an exemplary embodiment, the DAX™, which comprises the 30 largest German shares, and all its constituents together form the basis for the calculation of the correlation and dispersion indices. The shares included in the DAX™ represent roughly 70 percent of the overall market capitalization of listed German companies. Trading in these shares accounts for more than two thirds of Germany's exchange-traded equity volume. Based on its real-time concept, with updates carried out every 15 seconds, the DAX™ provides a comprehensive and up-to-date picture of the German stock market as listed on the Prime Standard of the FWB (Frankfurter Wertpapierbörse). The option contract on this index is one of the most traded products of Eurex™, the international derivatives exchange, and ranks among the top index options contracts worldwide.

In the embodiments, an index may for instance be a price index or a stock market index. A price index may be understood to be any single number calculated from an array of prices and quantities over a period. When not all prices and quantities of purchases can be recorded, a representative sample may be used instead. Inflation and cost indices may be calculated as price indices. A stock market index is a listing of stocks, and a statistic reflecting the composite value of a portfolio of its components. It is used as a tool to represent the characteristics of its component stocks, all of which bear some commonality such as trading on the same stock market exchange or region, belonging to the same industry, or having similar market capitalizations. An index may also be an index for derivatives or any other kind of financial instruments.

Automated Index Calculation

This section outlines a methodology to calculate correlation and dispersion indices according to an embodiment. It includes a description of the calculation of model-free implied volatilities because these are input parameters for the calculation of the correlation according to an embodiment. The indices may be calculated continuously and automatically by a data processing apparatus such as a computer system.

Figure 1:
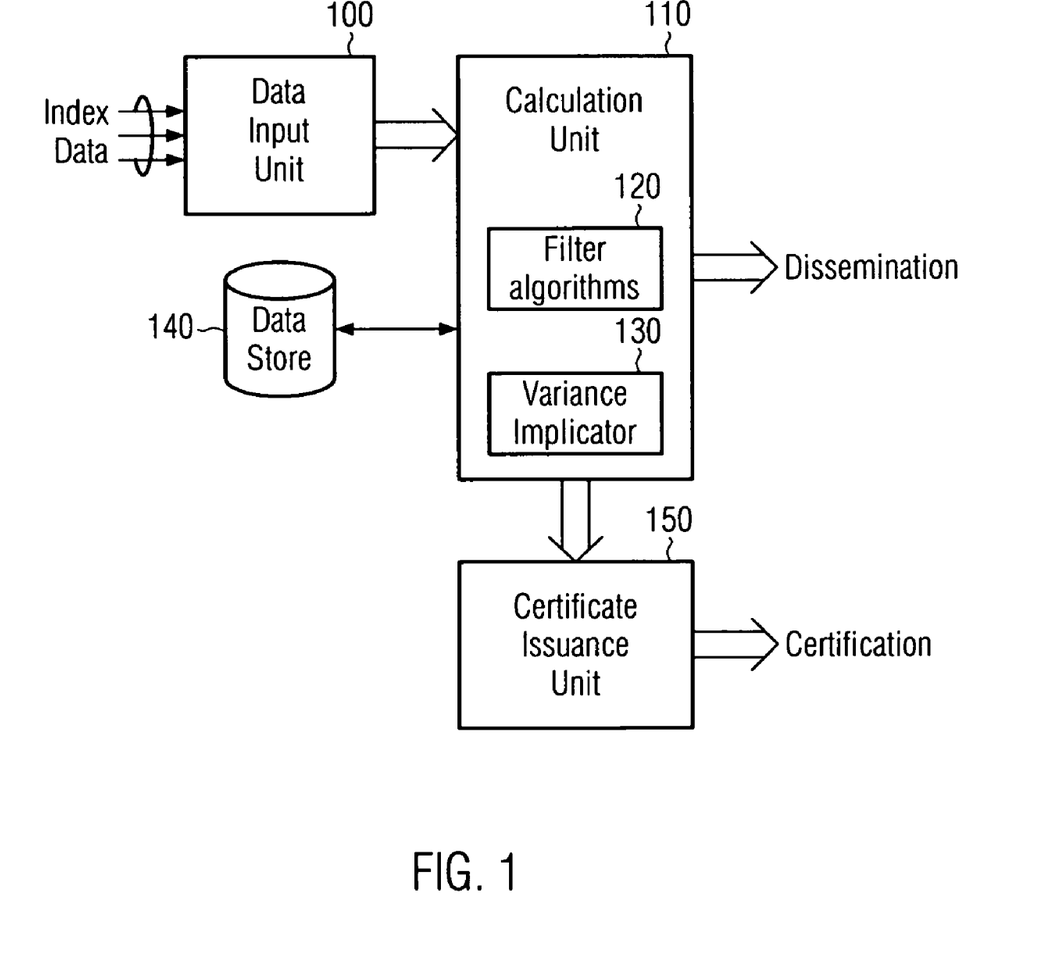
FIG. 1 is a block diagram illustrating a data processing apparatus according to an embodiment.

A data processing apparatus according to an embodiment is illustrated in FIG. 1. It comprises a data input unit 100 which receives data describing properties of the index and properties of at least some of its constituents. This data may for instance include price information, interest rates, times to expiration, and constituent weights. The received data is forwarded to calculation unit 110 where the data may be filtered using filter algorithms 120. Then, the calculation unit 110 may calculate an implied variance using variance implicator 130. Further, the data processing apparatus may include a certificate issuance unit 150 to use the calculated implied correlation and/or dispersion index to generate a certificate. It is however noted that another embodiment may use a data dissemination unit instead of the certificate issuance unit 150, where the data dissemination unit provides the index data in a special designed format to allow real-time and end-of-day distribution. Certificates may then be generated externally.

Figure 2:
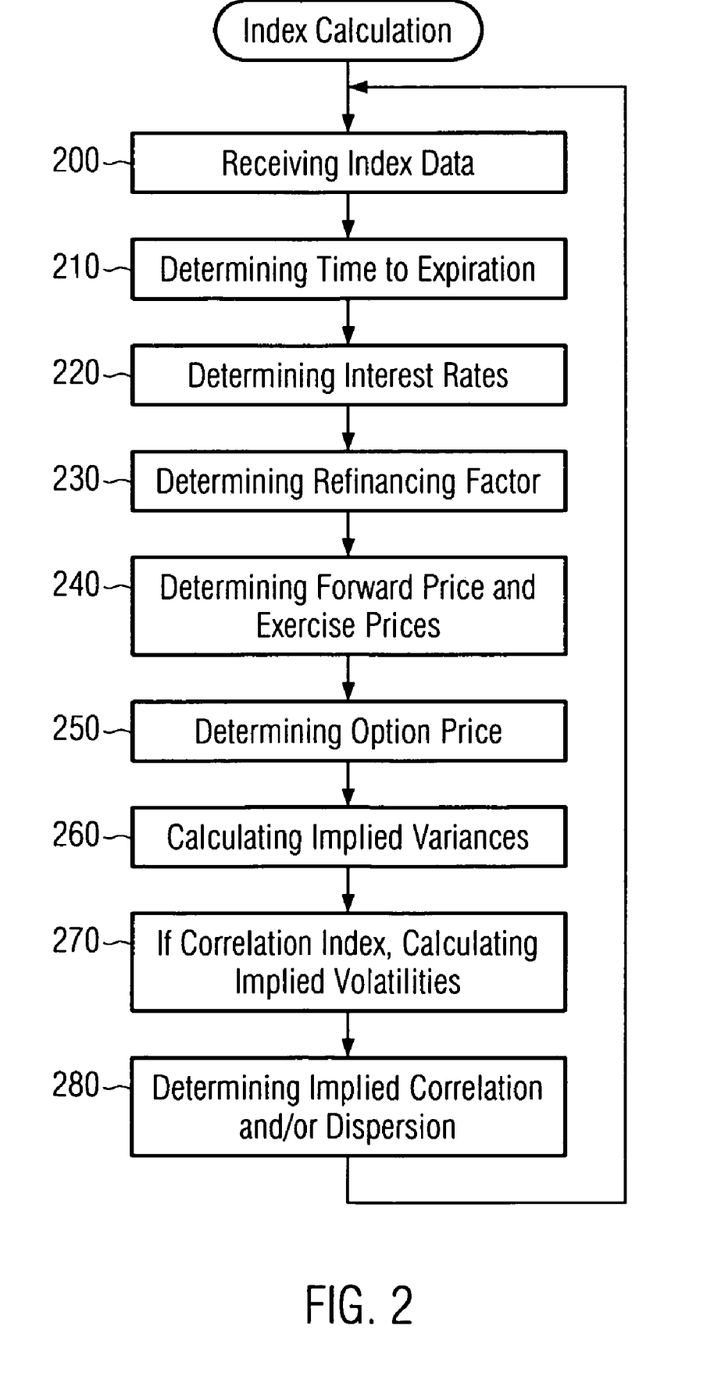
FIG. 2 is a flow chart illustrating an index calculation process according to an embodiment.

Referring to FIG. 2, a flow chart is presented showing process steps which may be performed for index calculation. Index data is received from unit 100 in step 200. This data may then be used to extract useful information in steps 210 to 250. Then, implied variances are calculated in step 260 by variance implicator 130. From these implied variances, implied volatilities may be determined in step 270 by applying the square root function. Finally, the implied correlation and/or dispersion may be determined. In the embodiment, the process is performed continuously, so the process returns to step 200 to receive fresh data.

Index Equation

Assuming an index consisting of n stocks and omitting the time stamp to facilitate the illustration, the variance (or volatility squared) of an index can be written as:

$$\sigma_P^2 = \sum_{i=1}^{n} \sum_{j=1}^{n} w_i w_j \sigma_i \sigma_j \rho_{ij}$$

where:

$\sigma_p^2$ is the variance of the index with n constituents, $\sigma_i$ is the square-root of variance (or volatility) of the index constituent i, $w_i$ is the index weight of constituent i, and $\rho_{i,j}$ is the correlation between stock i and stock j.

The index variance can be rewritten as:

$$\sigma_P^2 = \sum_{i=1}^{n} w_i^2 \sigma_i^2 + 2\sum_{i=1}^{n-1} \sum_{j>i} w_i w_j \sigma_i \sigma_j \rho_{i,j}$$
$$= \sum_{i=1}^{n} w_i^2 \sigma_i^2 + 2\bar{\rho}\sum_{i=1}^{n-1} \sum_{j>i} w_i w_j \sigma_i \sigma_j$$

Solving this equation for the parameter $\bar{\rho}$ yields an estimator for the average stock correlation within the index. The following expression results:

$$\bar{\rho} = \frac{\sigma_P^2 - \sum_{i=1}^{n} w_i^2 \sigma_i^2}{2\sum_{i=1}^{n-1} \sum_{j>i} w_i w_j \sigma_i \sigma_j} \quad (1)$$

The embodiments are therefore based on the finding that it is sufficient to observe $\sigma_p^2$, $\sigma_i^2$ and $w_i^2$ to determine a market cap weighted average index correlation. The use of historical values for $\sigma_p^2$, $\sigma_i^2$ and $w_i^2$ to evaluate equation (1) yields a measure for the historical correlation between the index constituents. On the other hand, the use of market implied $\sigma_p^2$, $\sigma_i^2$ and current values for $w_i$ may yield a measure for implied correlation volatilities as measures for between the index constituents. Such an implied correlation may measure the expectation of future realized correlation by the market. This correlation may be the correlation market participants are especially interested in because it may yield information about future correlation changes which are already priced in by the market. The continuous calculation of $\bar{\rho}$ may be seen to represent an index for market implied correlation.

The calculation of only the numerator of equation (1) yields a measure for the dispersion of the index and is given by:

$$\delta = \sigma_P^2 - \sum_{i=1}^{n} w_i^2 \sigma_i^2$$

The dispersion of an index measures the deviation between the variance of the index and the sum of the weighted variances of the index constituents. It is noted that the variance of the basket of index constituents may be different from the variance of the index. This is due to the correlation between all the stocks. Though the index is comprised of all the constituent stocks which have a correlation amongst themselves, the index still trades as one asset, and hence has one unique variance. On the other hand the index constituents may all trade independently, i.e. they may have their unique variances. To calculate the variance of the basket one may take into account the stocks' correlation matrix.

One approach to evaluate $\bar{\rho}$ is to use implied ATM (at-the-money option) volatilities for $\sigma_p^2$ and $\sigma_i^2$. A correlation index calculated on the basis of such input i parameters may represent an index for implied correlation based on ATM implied volatilities. However, the method to construct such an index is computational very intensive both due to the large number of index constituents (e.g. 30 DAX™ or 50 ESX constituents) but also and especially due to the numerical procedures which have to be applied. To find the implied volatilities near ATM, option prices have to be converted into implied volatilities using option models in combination with iterative procedures such as, e.g., the Newton-Raphson-Method. All dividends have to be known and constitute inputs for the computation. Finally, a linear interpolation procedure would be used to determine the correct value of the implied ATM-volatility. As the entire procedure is based on the application of an option model such as, e.g., the Black/Scholes-formula, the relevant critical assumptions apply.

The embodiments use a different approach to compute implied volatilities. This approach is a) not so computational intensive and b) does not rely on the critical assumptions of the Black/Scholes-formula. In an embodiment, model-free implied volatilities are used to calculate correlation indices.

Variance Equation

According to the embodiments, the calculation of correlation indices does not use implied ATM-volatilities to estimate an implied correlation, but does instead use implied variances of at-the-money as well as out-of-the-money options of a given time to expiration. These implied variances are the input parameters $\sigma_p^2$, $\sigma_i^2$ to calculate future realized correlation as shown in equation (1). The methodology to compute the variances is numerically straight-forward, since it may use only summations of option prices, does not need dividends as inputs and is therefore easy to build and run on any computer system.

In an embodiment, the model-free implied variance of a stock or index is given by:

$$\sigma_i^2 = \frac{2}{T_i} \sum_j \frac{\Delta K_{i,j}}{K_{i,j}^2} \cdot R_i \cdot M(K_{i,j}) - \frac{1}{T_i}\left(\frac{F_i}{K_{i,0}} - 1\right)^2, \quad (2)$$

$i = 1, 2, \ldots 8$ where:

$T_i$ is the time to expiration of the $i^{th}$ time to maturity of the ODAX or stock option (it is noted that in this and any other embodiment, the reference to the ODAX is to be understood as being made for explanatory reasons only, and any other index may be used as well).

$F_i$ is the forward price derived from the prices of the $i^{th}$ ODAX or stock option, for which the absolute difference between call and put prices (C and P) is smallest. Therefore:

$F_i = K_{min|Call-Put|} + R_i(\text{Call} - \text{Put})$

If a clear minimum does not exist, the average value of the relevant forward prices may be used instead.

$K_{i,j}$ is the exercise price of the $j^{th}$ out-of-the-money option of the $i^{th}$ ODAX or stock option expiry month both in ascending order.

$\Delta K_{i,j}$ is the interval between the relevant exercise prices or half the interval between the one higher and one lower exercise price. On the boundaries, the simple interval between the highest and second highest exercise price (or lowest and second lowest exercise price) may be used:

$$\Delta K_{i,j} = \frac{K_{i,j+1} - K_{i,j-1}}{2}$$

$K_{i,0}$ is the highest exercise price below forward price $F_i$.

$R_i$ is the refinancing factor of the $i^{th}$ ODAX or stock option:

$R_i = e^{r_i T_i}$ $r_i$ is the risk-free interest rate to expiration of the $i^{th}$ ODAX or stock option.

$M(K_{i,j})$ is the price of the option $K_{i,j}$ whereby $K_{i,j} \neq K_{i,0}$.

$M(K_{i,0})$ is the average of the put and call prices at exercise price $K_{i,0}$.

Extracting Data

During the calculation hours of the main correlation and dispersion indices and their respective subindices from 8:50 a.m. to 5:30 p.m. CET, the respective best bid and best ask prices of all DAX™ option contracts and all stock option contracts of the DAX™ constitutions listed on Eurex™ along with the various interest rates may be extracted from the stream of data generated by the Eurex™ system. To this end, a snapshot may be taken at one minute intervals.

Filtering Data

Option price data may be subject to filtering. For instance, all option prices that are one-sided—i.e. with either a bid or an ask price only—may be disregarded. The same applies to options without any price data. Another filter may verify whether the remaining options are quoted within the established maximum spreads for market-makers. In an embodiment, the maximum spread for DAX™ options may be derived from bid prices as shown in the table below:

| Bid (index points) | Maximum spread (index points) |
|---|---|
| 0-13.3 | 1.4 |
| 13.4-133.3 | 10% |
| >133.3 | 13.4 |

Example

Bid=45.32 and ask=54.30 (bid/ask spread=54.30−45.32=8.98)

Maximum spread: 45.32*0.10=4.53

As the bid/ask-spread of 8.98 is greater than 4.53, both prices (bid and ask) are rejected. The maximum spread for stock options of the DAX™ constituents may be calculated according to the following table:

| Bid range (EUR) | Maximum spread (EUR) |
|---|---|
| Stock options, class 1 | |
| 0-1 | 0.1 |
| 1.01-15 | 10% |
| >15 | 1.5 |
| Stock options, class 2 | |
| 0-1.5 | 0.15 |
| 1.51-22.5 | 10% |
| >22.5 | 2.25 |
| Stock options, class 3 | |
| 0-2 | 0.2 |
| 2.01-30 | 10% |
| >30 | 3 |
| Stock options, class 4 | |
| 0-1 | 0.15 |
| 1.01-15 | 15% |
| >15 | 2.25 |
| Stock options, class 5 | |
| 0-1.5 | 0.23 |
| 1.51-22.5 | 15% |
| >22.5 | 3.38 |
| Stock options, class 6 | |
| 0-2 | 0.3 |
| 2.01-30 | 15% |
| >30 | 4.5 |
| Stock options, class 7 | |
| 0-1 | 0.2 |
| 1.01-15 | 20% |
| >15 | 3 |
| Stock options, class 8 | |
| 0-1.5 | 0.3 |
| 1.51-22.5 | 20% |
| >22.5 | 4.5 |
| Stock options, class 9 | |
| 0-2 | 0.4 |
| 2.01-30 | 20% |
| >30 | 6 |

In an embodiment, market-makers are permitted to increase their quotation spreads under very turbulent trading conditions, and maximum spreads may then be set higher accordingly.

Preparing Data a) Determining the Prices Used

The mid price may be calculated for filtered option prices, using the respective best bid and best ask. The most recent of each of the following pieces of information may be used subsequently:

Last traded price

Mid price

Settlement price (previous day)

Example (Call Options)

| Underlying | Settlement | Bid (time) | Ask (time) | Mid (time) | Last-traded (time) | Price |
|---|---|---|---|---|---|---|
| 4000 | 383.30 | — | | | 383.5 | 383.30 |
| 4050 | 333.40 | | | | 383.5 (09:05) | 383.50 |
| 4100 | 283.50 | 287.1 (09:04) | 290.0 (09:05) | 288.55 (09:05) | | 288.55 |
| 4150 | 233.70 | 237.2 (09:03) | 240.2 (09:05) | 239.70 (09:05) | 237.2 (09:01) | 239.70 | b) Cutting the Wings

There may be yet another filter to ensure that the various prices used (last traded, mid and settlement price) do not fall short of a minimum value of 0.5 (index) points for the DAX™ options and 0.05 Euro for the stock options of DAX™ constituents. For example, if there are two or more options with different exercise prices and mid prices exactly equal the minimum value of 0.5 points for the ODAX or 0.05 Euro for the DAX™ options just the one nearest to the at-the-money point is taken into consideration, according to an embodiment. With this, options that are far out-of-the money and that do not have much influence on the result of the calculation may be filtered out and do not need to be considered.

Calculation Example

This section provides a comprehensive example for the calculation of correlation indices by using model-free implied variances of the DAX™ and its constituents (the calculation of the dispersion indices is not shown since the main calculation steps are similar). The example is based on the following assumptions:

Trading day is 2 Nov. 2005.

Expiration day is 18 Nov. 2005.

The future realized correlation is calculated at 5:30 PM on that day.

The main correlation index for 30 days is calculated using interpolation of the two sub-indices for options with option expires of one and two months.

In an embodiment, all relevant input parameters are calculated successively.

a) Determining the Time to Expiration $T_i$

The time to expiration $T_i$ may be determined in step 210 of FIG. 2 by the following equation:

$$T_i = T_{Settlement\text{-}Calculation}/T_{Year}$$

where:

$T_{Settlement-Calculation}$ are seconds between index calculation and settlement, and $T_{year}$ are seconds per annum.

Example

Index calculation: 02.11.2005 at 05:30 p.m. CET
Expiration (i=1): 18.11.2005 at 1:00 p.m. CET
$T_i=(19.5*60*60+15*24*60*60)/(365*24*60*60)$
 $=0.043322$ b) Determining Risk-Free Interest Rates Linear interpolation may be used in step 220 to determine interest rates, the terms of which match the time to expiration of the ODAX and stock options.

$$r_i \equiv r(T_i) = \frac{T_{k+1} - T_i}{T_{k+1} - T_k} r(T_k) + \frac{T_i - T_k}{T_{k+1} - T_k} r(T_{k+1}); \quad T_k \leq T_i < T_{k+1}$$

Example: Since there are 15 days until the next expiration date, the EONIA interest rate (1 day) and the EURIBOR interest rate (1 month) may be used to get the appropriate interest rate for the 15 days:

$r(T_k)=2.07\%$ (EONIA, as of 02.11.2005)
$r(T_{k+1})=2.12\%$ (EURIBOR, 1 month, as of 02.11.2005)
$T_{k+1}=0.082192$ (time to expiration for EURIBOR, 1 month)
$T_k=0.002740$ (time to expiration for EONIA)

$$r(T_1) = \frac{0.082192 - 0.043322}{0.082192 - 0.002740} 2.07\% + \frac{0.043322 - 0.002740}{0.082192 - 0.002740} 2.12\%$$
$$= 2.097582\%$$

c) Determining the Refinancing Factor $R_i$

The refinancing factor $R_i$ may be determined in step 230 according to the following equation:

$R_i = e^{r_i T_i}$

Example $R_i = e^{r(T1)*T1} = e^{0.020976*0.04332} = 1.000909$

In general, there may be different approaches to calculate refinancing factors. In one embodiment, there is the discrete refinancing factor. For example, if a bank offers an interest rate for deposits of 2%, one would start with 100 Euro and get (100*1.02%) 102 Euro at the end of the year. In another embodiment, there is the continuous approach. It may use the form $e^{r-t}$.

d) Determining the Forward Price $F_i$ and the Exercise Prices $K_{i,0}$

The (synthetic) forward price of the $i^{th}$ expiry month may be derived in step 240 from option prices according to the following equation:

$F_i = K_{min|Call-Put|} + R_i(\text{Call}-\text{Put})$

Accordingly, the forward price $F_1$ of the first expiry month and the exercise price $K_{1,0}$, where the absolute difference between call and put is minimized, may be calculated for the ODAX in the following example (cf. also the values in the table below):

Example $R_1 = 1.000909$ $K_{1,0,ODAX} = 4950$ $F_{1,ODAX} = 4950 + 1.000909 * 2.50 = 4952.5023$ For the 30 stock options of the index constituents, the (synthetic) forward price may be calculated in the same way. The following example uses the DCX stock option for explanatory reasons:

Example $K_{1,0,DCX} = 42$ $F_{1,DCX} = 42 + 1.000909 * 0.48 = 42.4804$

Where there are several pairs of calls and puts with identical price differences, a forward price may be calculated for each of the corresponding exercise prices. $K_{i,0}$ may accordingly be defined as the closest exercise price below the simple average of these forward prices.

It is noted that in an embodiment, e.g. for the determination of the forward level for american options, a dividend term may be considered. Put-Call parity would then hold only approximately and would read $c-p=PV*(F-K)-D$.

e) Determining the Option Price $M(K_{i,j})$

The price $M(K_{i,j})$, which may be used for the $j^{th}$ out-of-the-money option (OTM) of the $i^{th}$ expiry month, may be determined in step 250 as follows:

$$M(K_{i,j}) = \begin{cases} \text{Put} & : K_{i,j} < K_{i,0} \\ \frac{\text{Put} + \text{Call}}{2} & : K_{i,j} = K_{i,0} \\ \text{Call} & : K_{i,j} > K_{i,0} \end{cases}$$

This equation may determine to use OTM options, or in the case of ATM options, the averages of the respective put and call options. This may be due to the higher liquidity of OTM options in comparison to in-the-money options.

f) Determining the Variances

The implied variances of the stock index and the index constituents may be calculated in step 260 according to equation (2). Below an illustrative calculation for the ODAX is given:

| Exercise Price $K_{i,j}$ | $\Delta K_{i,j}$ | Call | Put | \|Call − Put\| | $M(K_{i,j})$ | $\frac{\Delta K_{i,j}}{K_{i,j}^2} R_i M(K_{i,j})$ |
|---|---|---|---|---|---|---|
| 4150 | 50 | 831.2 | 0.3 | 830.9 | 0.3 | |
| 4200 | 50 | 781.3 | 1.1 | 780.2 | 1.1 | 0.0000031 |
| 4250 | 50 | 731.5 | 1.4 | 730.1 | 1.4 | 0.0000039 |
| 4300 | 50 | 681.6 | 1.6 | 680.0 | 1.6 | 0.0000043 |
| 4350 | 50 | 631.9 | 1.9 | 630.0 | 1.9 | 0.0000050 |
| 4400 | 50 | 532.0 | 1.6 | 530.4 | 1.6 | 0.0000041 |
| 4450 | 50 | 532.6 | 2.2 | 530.4 | 2.2 | 0.0000056 |
| 4500 | 50 | 424.0 | 2.5 | 421.5 | 2.5 | 0.0000062 |
| 4550 | 50 | 434.0 | 3.5 | 430.5 | 3.5 | 0.0000085 |

-continued

| Exercise Price $K_{i,j}$ | $\Delta K_{i,j}$ | Call | Put | \|Call − Put\| | $M(K_{i,j})$ | $\frac{\Delta K_{i,j}}{K_{i,j}^2} R_i M(K_{i,j})$ |
|---|---|---|---|---|---|---|
| 4600 | 50 | 337.0 | 4.7 | 332.3 | 4.7 | 0.0000111 |
| 4650 | 50 | 336.9 | 7.8 | 329.1 | 7.8 | 0.0000181 |
| 4700 | 50 | 218.5 | 10.8 | 207.7 | 10.8 | 0.0000245 |
| 4750 | 50 | 203.4 | 16.5 | 186.9 | 16.5 | 0.0000366 |
| 4800 | 50 | 154.3 | 23.5 | 130.8 | 23.5 | 0.0000510 |
| 4850 | 50 | 131.0 | 34.0 | 97.0 | 34.0 | 0.0000723 |
| 4900 | 50 | 100.4 | 47.1 | 53.3 | 47.1 | 0.0000982 |
| 4950 | 50 | 70.4 | 67.9 | 2.5 | 69.2 | 0.0001412 |
| 5000 | 50 | 46.5 | 92.0 | 45.5 | 46.5 | 0.0000931 |
| 5050 | 50 | 27.6 | 133.0 | 105.4 | 27.6 | 0.0000542 |
| 5100 | 50 | 16.5 | 199.2 | 182.7 | 16.5 | 0.0000317 |
| 5150 | 50 | 9.0 | 180.9 | 171.9 | 9.0 | 0.0000170 |
| 5200 | 50 | 4.4 | 225.0 | 220.6 | 4.4 | 0.0000081 |
| 5250 | 50 | 1.9 | 271.8 | 269.9 | 1.9 | 0.0000034 |
| 5300 | 50 | 1.0 | 400.0 | 399.0 | 1.0 | 0.0000018 |
| 5350 | 50 | 0.7 | 369.2 | 368.5 | 0.7 | 0.0000012 |
| 5400 | 50 | 0.6 | 455.0 | 454.4 | 0.6 | 0.0000010 |
| 5450 | 50 | 0.5 | 468.4 | 467.9 | 0.5 | 0.0000008 |
| 5500 | 50 | 0.3 | 518.2 | 517.9 | 0.3 | |
|  |  |  |  |  |  | 0.000706 |

Now the implied variance of the DAX™ can be calculated:

$$\sigma^2_{1,DAX} = \frac{2}{0.043322} 0.000706 - \frac{1}{0.043322}\left(\frac{4952.5023}{4950} - 1\right)^2$$
$$= 0.032595$$

Again, the case of DCX is taken to exemplarily calculate the index constituents' implied variances:

| Exercise Price $K_{i,j}$ | $\Delta K_{i,j}$ | Call | Put | \|Call − Put\| | $M(K_{i,j})$ | $\frac{\Delta K_{i,j}}{K_{i,j}^2} R_i M(K_{i,j})$ |
|---|---|---|---|---|---|---|
| 38 | 1 | 3.83 | 0.06 | 3.77 | 0.06 | 0.000042 |
| 39 | 1 | 2.91 | 0.23 | 2.68 | 0.23 | 0.000151 |
| 40 | 1 | 2.08 | 0.30 | 1.78 | 0.30 | 0.000188 |
| 41 | 1 | 1.28 | 0.62 | 0.66 | 0.62 | 0.000369 |
| 42 | 1 | 0.67 | 1.15 | 0.48 | 0.91 | 0.000516 |
| 43 | 1 | 0.43 | 1.84 | 1.41 | 0.43 | 0.000233 |
| 44 | 1 | 0.17 | 2.45 | 2.28 | 0.17 | 0.000088 |
| 45 | 1 | 0.08 | 3.35 | 3.27 | 0.08 | 0.000040 |
| 46 | 1 | 0.05 | 4.80 | 4.75 | 0.05 | 0.000024 |
| 47 | 1 | 0.02 | 5.26 | 5.24 | 0.02 |  |
|  |  |  |  |  |  | 0.00165 |

From this, the implied variance of the DCX option can be computed as follows:

$$\sigma^2_{1,DCX} = \frac{2}{0.043322} 0.00165 - \frac{1}{0.043322}\left(\frac{42.4804}{42} - 1\right)^2$$
$$= 0.07315$$

In the present example, given the implied variance of the stock index $\sigma_{i,DAX}^2$, the 30 implied variances of the stock index constituents $\sigma_i^2$, and their weights $w_i^2$, it is then possible to calculate the future realized correlation $\bar{\rho}_i$ according to equation (1), for instance every minute for every desired time to expiration i. The implied variances for the DAX™ and its constituents for two expiration dates, November 2005 (200511) and December 2005 (200512), are shown in the following table:

|  | Index | Implied variance | |
|---|---|---|---|
| Name | weight | 200511 | 200512 |
| DAX™ |  | 3.26% | 3.26% |
| ADIDAS | 1.22% | 10.99% | 7.99% |
| ALLIANZ | 8.84% | 5.60% | 5.19% |
| ALTANA | 0.61% | 7.72% | 7.63% |
| BASF | 5.81% | 7.10% | 5.70% |
| BAY.HYPO-VEREINSBK. | 2.68% | 8.74% | 6.78% |
| BAY.MOTOREN WERKE | 2.26% | 8.40% | 5.52% |
| BAYER | 3.97% | 9.59% | 7.13% |
| COMMERZBANK | 2.29% | 11.33% | 7.95% |
| CONTINENTAL | 1.81% | 7.71% | 7.15% |
| DAIMLERCHRYSLER | 6.80% | 7.32% | 7.25% |
| DEUTSCHE BANK | 7.62% | 5.38% | 5.46% |
| DEUTSCHE BOERSE | 1.59% | 10.61% | 8.73% |
| DEUTSCHE POST | 2.16% | 5.11% | 4.60% |
| DT.TELEKOM | 7.37% | 5.65% | 4.53% |
| E.ON AG | 9.68% | 7.68% | 5.78% |
| FRESEN.MED.CARE | 0.50% | 8.00% | 5.45% |
| HENKEL | 0.87% | 2.51% | 2.69% |
| INFINEON | 0.90% | 13.99% | 11.39% |
| LINDE | 0.90% | 6.59% | 5.44% |
| LUFTHANSA | 0.91% | 7.55% | 7.46% |
| MAN | 1.07% | 9.43% | 7.18% |
| METRO | 0.99% | 4.66% | 5.22% |
| MUENCH.RUECKVERS. | 3.45% | 6.49% | 5.52% |
| RWE | 4.67% | 6.99% | 5.72% |
| SAP | 5.69% | 4.86% | 4.59% |
| SCHERING | 1.68% | 4.73% | 4.90% |
| SIEMENS | 9.81% | 3.50% | 3.00% |
| THYSSENKRUPP | 1.31% | 5.15% | 5.23% |
| TUI | 0.68% | 8.52% | 7.57% |
| VOLKSWAGEN | 1.87% | 9.79% | 8.65% |
| $\bar{\rho}$ |  | 48.01% | 57.11% |

The last row of the table shows the values for the future realized correlation for the next two expiration dates, i.e. the first two correlation sub-indices. For the first expiration date, which corresponds to the first correlation sub-index, the correlation may be calculated as follows, noting that the double sum in the denominator of equation (1) consists in the DAX™ case of $(30^2-30)*0.5=435$ weighted market implied variances:

$$\bar{\rho}_1 = \frac{3.26\% - (1.22\%^2 * 10.99\% + \ldots + 1.87\%^2 * 9.79\%)}{2(1.22\% * 8.84\% * 10.99\% * 5.6\% + \ldots + 0.68\% * 1.87\% * 8.52\% * 9.79\%)} = 48.01\%$$

The calculation of the value for the correlation with expiration in December 2005, i.e. the second correlation sub-index, may be done accordingly.

Constructing the Correlation Index

Apart from the sub-indices for the various individual times to expiration, the correlation index described in the present application may be determined with a constant remaining time to expiration of, e.g., 30 days. First, an implied correlation level for each of the first couple of option expires of a specific index (e.g. DAX™, EuroStoxx, SMI) may be required to be computed (see above). In this way, the implied correlation term structure (e.g., this could be the first 8 option expires) can be obtained. A 30-day rolling index may then be constructed by interpolation of the two nearest sub indices (with time to expiration of one and two months). The last two days before expiration, when the correlation sub-index is biased due to the upcoming expiration, the 30-day correlation index may be calculated by using extrapolation. In this case, the correlation sub-indices of the two next expirations (two and three months) may be used because they are as close to the time to expiration of 30 calendar days as possible.

The interpolation of two correlations at hand may be done as follows:

$$\overline{\rho}_x = 100 * \left[ T_i \overline{\rho}_i \left[ \frac{N_{T_{i-1}} - N_T}{N_{T_{i-1}} - N_{T_i}} \right] + T_{i+1} \overline{\rho}_{i+1} \left[ \frac{N_T - N_{T_i}}{N_{T_{i-1}} - N_{T_i}} \right] \right] \frac{N_{365}}{N_T}$$

where:

$\overline{\rho}_i$ is the correlation sub-index of expiration i.

$\overline{\rho}_{i+1}$ is the correlation sub-index of expiration i+1.

$N_{T_i}$ is the time to expiration of the $i^{th}$ correlation sub-index.

$N_{T_{i+1}}$ is the time to expiration of the $i+1^{th}$ correlation sub-index.

$N_T$ is the time for x days where x represents the desired index duration.

$N_{365}$ is the time for a standard year.

Given the two values for future realized correlation shown above, the 30-day future realized correlation index ($\overline{\rho}_{30}$), in this case x equals 30, may be computed:

$$\overline{\rho}_{30} = 100 * \left[ 0.0433 * 48.01\% \left[ \frac{43.79 - 30}{43.79 - 15.79} \right] + \right.$$
$$\left. 0.1200 * 57.11\% \left[ \frac{30 - 15.79}{43.79 - 15.79} \right] \right] \frac{365}{30} = 54.77\%$$

The result of 54.77% is the 30-day future realized (market implied) correlation and represents the current value of the correlation index.

Fields of Application

The calculation and dissemination of a correlation index allows for the implementation of a new breed of futures. Futures may be issued on the correlation index. A market future, like the FDAX, may be used to hedge pure market movements, i.e., the delta of the market. A volatility future may be used to hedge market volatility and market risks, i.e. the vega. A future on an implied correlation index on the other hand would hedge pure diversification risk, i.e. the risk of all market products moving in the same direction. This would enable investors to generate isolated exposure to this particular kind of risk. This would therewith address a completely new risk segment and in this way provide a new innovative approach to hedge diversification risks inherent in the market place. Investors can use futures on such correlation indices for the following purposes:

To gain pure exposure to correlation, i.e., to the degree of diversification of the index;

To make a bet on future realized correlation. In case, investors expect future realized correlation to rise, they would buy futures on the correlation index;

To trade the spread between different correlation indices; and

To hedge the diversification of the portfolio. In case, investors desire to have a certain (constant) degree of diversification of their portfolio, including futures on future realized correlation in their portfolio could enable them to conserve the desired degree of diversification.

Another field of application for such indices may be that issuers of certificates take indices as underlyings for certificates. The novel correlation index could be used as an underlying for issuers of certificates on market implied correlation. Such certificates might be suited to fulfill institutional or sophisticated private investors' needs. Since correlation should be negatively correlated to the underlying stock index the inclusion of such certificates could enhance the risk-return profile of equity portfolios.

The second class of indices, the dispersion indices, could serve investors as trading benchmark as well as to use it as underlying for certificates. The motivation for a dispersion trading strategy ("Buy index option, sell options on index constituents" or vice versa) may be to profit from price differences in volatility markets using index options and options on individual stocks, i.e. the index constituents.

Publication

The main correlation and dispersion indices and the various sub-indices may be calculated and disseminated on each Eurex™ exchange trading day, during the period from 8:50 a.m. to 5:30 p.m. CET. The continuous calculation of the index may, however, only commence as soon as all required input data is available. The dissemination of the main indices may begin as soon as two sub-indices are available for interpolation. However, the indices may start with data from the previous trading day (settlement prices) as long as no data from the current day is at hand. In line with the expiration structure of options, each of the correlation sub-indices may be assigned to a specific expiration, which can be directly identified from the respective code. There may be a system of codes and ISINs which allows easy identification of the respective sub-index.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the by the spirit and scope of the appended claims.

What is claimed is:

1. A data processing apparatus for calculating an implied correlation of an index having a plurality of constituents, the apparatus comprising:

a data input unit configured to receive data describing properties of the index and properties of at least some of its constituents; and a calculation unit configured to calculate said implied correlation of the index based on the received data, wherein said calculation unit is configured to determine an implied variance of the index and an implied variance of each of said at least some constituents, determine an implied volatility of the index and an implied volatility of each of said at least some constituents from the implied variances, and derive said implied correlation from the implied variances and implied volatilities.

2. The data processing apparatus of claim 1, wherein said calculation unit is further configured to not require the calculation of a volatility when determining said implied variances.

3. The data processing apparatus of claim 1, wherein the data describing properties of the index and properties of the at least some of its constituents include price and rate data and data indicating expiration times.

4. The data processing apparatus of claim 3, wherein the data describing properties of the index and properties of the at least some of its constituents include an index weight for each one of said at least some constituents.

5. The data processing apparatus of claim 1, wherein said calculation unit is configured to apply a model-free algorithm when determining said implied variances.

6. The data processing apparatus of claim 5, wherein said model-free algorithm does not require option models as an input.

7. The data processing apparatus of claim 1, wherein said calculation unit is configured to further calculate an implied correlation for a predetermined number of sub-indices which are each for individual maturities.

8. The data processing apparatus of claim 7, wherein said calculation unit is configured to start calculating an implied correlation for a sub-index as soon as all required input data is available, and to start calculating said implied correlation of the index as soon as a predetermined number of sub-indices is available.

9. The data processing apparatus of claim 8, wherein said predetermined number of sub-indices is two.

10. The data processing apparatus of claim 1, wherein said calculation unit is configured to calculate said implied correlation of the index on a continuous basis.

11. The data processing apparatus of claim 1, further comprising:
a certificate issuance unit configured to issue one or more certificates having said implied correlation as underlying.

12. The data processing apparatus of claim 1, further comprising:
a data dissemination unit configured to disseminate said implied correlation in a pre-defined data format.

13. The data processing apparatus of claim 1, wherein said calculation unit is configured to filter the received data before calculating said implied variance of the index.

14. A data processing method of calculating an implied correlation and/or dispersion of an index having a plurality of constituents using a computer, comprising:
receiving data with a data input unit describing properties of the index and properties of at least some of its constituents;
determining with a calculation unit an implied variance of the index and an implied variance of each of said at least some constituents based on the received data using a model-free algorithm; and
deriving with said calculation unit said implied correlation and/or dispersion of the index from the determined implied variances.

15. The data processing method of claim 14, further comprising, when calculating an implied correlation of the index:
determining with said calculation unit an implied volatility of the index and an implied volatility of each of said at least some constituents from the implied variances.

16. The data processing method of claim 14, wherein determining said implied variances does not require calculating a volatility.

17. The data processing method of claim 14, wherein the data describing properties of the index and properties of the at least some of its constituents include price and rate data and data indicating expiration times.

18. The data processing method of claim 17, wherein the data describing properties of the index and properties of the at least some of its constituents include an index weight for each one of said at least some constituents.

19. The data processing method of claim 14, wherein said model-free algorithm does not require option models as an input.

20. The data processing method of claim 14, further comprising:
calculating with said calculation unit an implied correlation and/or dispersion for a predetermined number of sub-indices which are each for individual maturities.

21. The data processing method of claim 20, wherein calculating an implied correlation for a sub-index is commenced as soon as all required input data is available, and calculating said implied correlation and/or dispersion of the index is commenced as soon as a predetermined number of sub-indices is available.

22. The data processing method of claim 21, wherein said predetermined number of sub-indices is two.

23. The data processing method of claim 14, wherein said implied correlation and/or dispersion of the index is calculated on a continuous basis.

24. The data processing method of claim 14, further comprising:
issuing with a certificate issuance unit one or more certificates having said implied correlation and/or dispersion as underlying.

25. The data processing method of claim 14, further comprising:
disseminating with a data dissemination unit said implied correlation in a pre-defined data format.

26. The data processing method of claim 14, further comprising:
filtering with said calculating unit the received data before calculating said implied variance of the index.

27. A computer-readable medium storing computer-readable instructions that, when executed by a computer, cause said computer to calculate an implied correlation and/or dispersion of an index, said computer readable instructions comprising:
instructions for receiving data with a data input unit describing properties of the index and properties of at least some of its constituents;
instructions for determining with a calculation unit an implied variance of the index and an implied variance of each of said at least some constituents based on the received data using a variance calculation scheme not requiring the calculation of a volatility;
instructions for calculating with said calculation unit said implied correlation and/or dispersion of the index using the determined implied variances; and
instructions for displaying said implied correlation and/or dispersion of the index.

* * * * *